United States Patent [19]

Berry et al.

[11] Patent Number: 5,529,087
[45] Date of Patent: Jun. 25, 1996

[54] SYSTEM FOR REMOTELY SERVICING A TOP LOADING CAPTIVE BALL VALVE

[75] Inventors: Stephen M. Berry, Idaho Falls, Id.; Matthew L. Porter, North Potomac, Md.

[73] Assignee: Lockheed Idaho Technologies Company, Idaho Falls, Id.

[21] Appl. No.: 394,567

[22] Filed: Feb. 27, 1995

[51] Int. Cl.$^6$ .................................................. F16K 43/00
[52] U.S. Cl. .......................... 137/315; 137/454.6; 251/292
[58] Field of Search .......................... 137/15, 315, 454.2, 137/454.5, 454.6; 251/292

[56] References Cited

U.S. PATENT DOCUMENTS

| | | | |
|---|---|---|---|
| 992,502 | 5/1911 | Hollis | 251/292 |
| 1,162,935 | 12/1915 | Lange | 251/292 |
| 2,028,815 | 1/1936 | Wood | 251/252 |
| 2,138,530 | 11/1938 | Wagner | 251/292 |
| 3,656,501 | 4/1972 | Buchta | 137/315 |
| 3,799,191 | 3/1974 | Burkhardt et al. | 137/454.2 |
| 4,187,872 | 2/1980 | Freeman et al. | 137/454.6 |
| 4,306,583 | 12/1981 | Tacoulat | 137/454.6 |
| 4,605,036 | 8/1986 | Smith et al. | 137/454.6 |
| 4,606,368 | 8/1986 | McCafferty | 137/315 |
| 4,875,523 | 10/1989 | Thornburrow | 137/315 |
| 4,917,141 | 4/1990 | Brunel et al. | 137/315 |
| 4,961,444 | 10/1990 | Morgan et al. | 137/315 |
| 4,986,301 | 1/1991 | Ziliani et al. | 137/315 |
| 5,129,417 | 7/1992 | Dupont et al. | 137/315 |
| 5,135,019 | 8/1992 | Dupont | 137/315 |

Primary Examiner—George L. Walton
Attorney, Agent, or Firm—Spensley Horn Jubas & Lubitz; Thorpe North & Western

[57] ABSTRACT

An attachment for facilitating servicing of a valve, the valve including: an assembly composed of a valve seat defining a flow path, a flow control member movable relative to the valve seat for blocking or unblocking the valve seat, and a control device including a stem coupled to the flow control member and operable for moving the flow control member relative to the valve seat; a housing for receiving the assembly, the housing having an opening via which the assembly can be removed from, and installed in, the housing, and the housing having a plurality of threaded studs which surround the opening and project away from the housing; a valve housing cover for closing and sealing the opening in the housing, the cover having a first bore for passage of the stem of the control device when the assembly is installed in the housing and a plurality of second bores each located for passage of a respective stud when the cover closes the opening in the housing. A plurality of threaded nuts are engageable with the studs for securing the cover to the housing when the cover closes the opening in the housing, wherein the attachment comprises: a plurality of nut guide devices removable from the housing and each operatively associated with a respective stud for retaining a respective nut and guiding the respective nut into alignment with the respective stud to enable the respective nut to be rotated into engagement with the respective stud; and aligning the nut guide devices with the studs.

11 Claims, 5 Drawing Sheets

SYSTEM FOR REMOTELY SERVICING A TOP LOADING CAPTIVE BALL VALVE

ORIGIN OF THE INVENTION

This invention was conceived or first reduced to practice in the course of, or under Contract Number DEAC-0784-ID-12435 between the Westinghouse Idaho Nuclear Company and the United States Government, represented by the Department of Energy. The United States Government may have rights in this invention.

BACKGROUND OF THE INVENTION

Various industrial installations include pipelines containing valves at locations which are inaccessible, or accessible only with difficulty, or are within hazardous environments. Therefore, servicing or replacement of such valves is a difficult and time-consuming operation and could require maintenance personnel to be exposed to radiation or other hazards. Frequently, it will be necessary to completely shut-down a portion of the installation which is associated with the valve and the duration of the shut down depends on the time required to complete servicing of the valve.

SUMMARY OF THE INVENTION

It is an object of the present invention to facilitate and expedite servicing of a top loading valve which can be accessed only with difficulty.

Another object of the invention is to facilitate servicing of a top loading valve which is installed within an enclosure, without requiring entry of personnel into the enclosure.

Another object of the invention is to operate a top loaded valve from a remote location by an actuating device which does not transmit seismic movements or forces to the valve stem.

The above and other objects are achieved, according to the invention, by the provision of an attachment for facilitating remote servicing of a valve, in which the valve includes: an assembly composed of a valve seat defining a flow path, a flow control member movable relative to the valve seat for blocking or unblocking the flow path and control means including a stem coupled to the flow control member and operable for moving the flow control member relative to the valve seat; a housing for receiving the assembly, the housing having an opening via which the assembly can be removed from, and installed in, the housing, and the housing having a plurality of first threaded fastening components which surround the opening; a valve housing cover for closing and sealing the opening in the housing, the cover having a first bore for passage of the stem of the control means when the assembly is installed in the housing and a plurality of second bores each located to be aligned with a respective first threaded fastening component when cover 10 closes the opening in housing 1; and a plurality of second threaded fastening components engageable with the first threaded fastening components for securing the cover to the housing when the cover closes the opening in the housing, and the attachment comprises: a plurality of fastening component guide devices removable from the housing and each operatively associated with a respective first threaded fastening component for retaining a respective second threaded fastening component and guiding the respective second threaded fastening component into alignment with the respective first threaded fastening component to enable the respective second threaded fastening component to be rotated into engagement with the respective first threaded fastening component; and attachment positioning means for aligning the fastening component guide devices with the first threaded fastening components.

In preferred embodiments of the invention, the first threaded fastening components are studs which project away from the housing and the second threaded fastening components are nuts. However, these components can be interchanged, i.e. the housing can be provided with threaded bores to receive studs, in which case each threaded component guide device can be provided with a bore for holding a respective stud in a proper orientation to be screwed into a threaded bore in the housing.

In further accordance with the invention, the above attachment is combined with: a stem adapter fixed to the stem of the flow control member, the stem being rotatable about an axis for moving the flow control member relative to the valve seat, and the stem adapter having a first engagement end with a noncircular cross section in a plane perpendicular to the axis; and an actuating tool comprising a second engagement end formed to engage the first engagement end in a manner to permit the stem adapter to be rotated about the axis by rotation of the actuating tool, wherein the first and second engagement ends are dimensioned to engage one another with a first play in the plane perpendicular to the axis, and the second engagement end engages in the stem receiving member with a second play in the plane perpendicular to the axis, the first play being greater than the second play in every direction in the plane perpendicular to the axis.

In further accordance with the invention, the above attachment is combined with: a stem adapter fixed to the stem of the flow control member, the stem adapter having a coupling portion; and a removal tool having an end which is couplable to the coupling portion for enabling removal of the assembly from the housing by movement of the removal tool when the nuts are disengaged from the studs.

BRIEF DESCRIPTION OF THE DRAWINGS

FIG. 4 is a cross section taken along the line IV—IV of FIG. 5.

DESCRIPTION OF THE PREFERRED EMBODIMENTS

Figure 1:
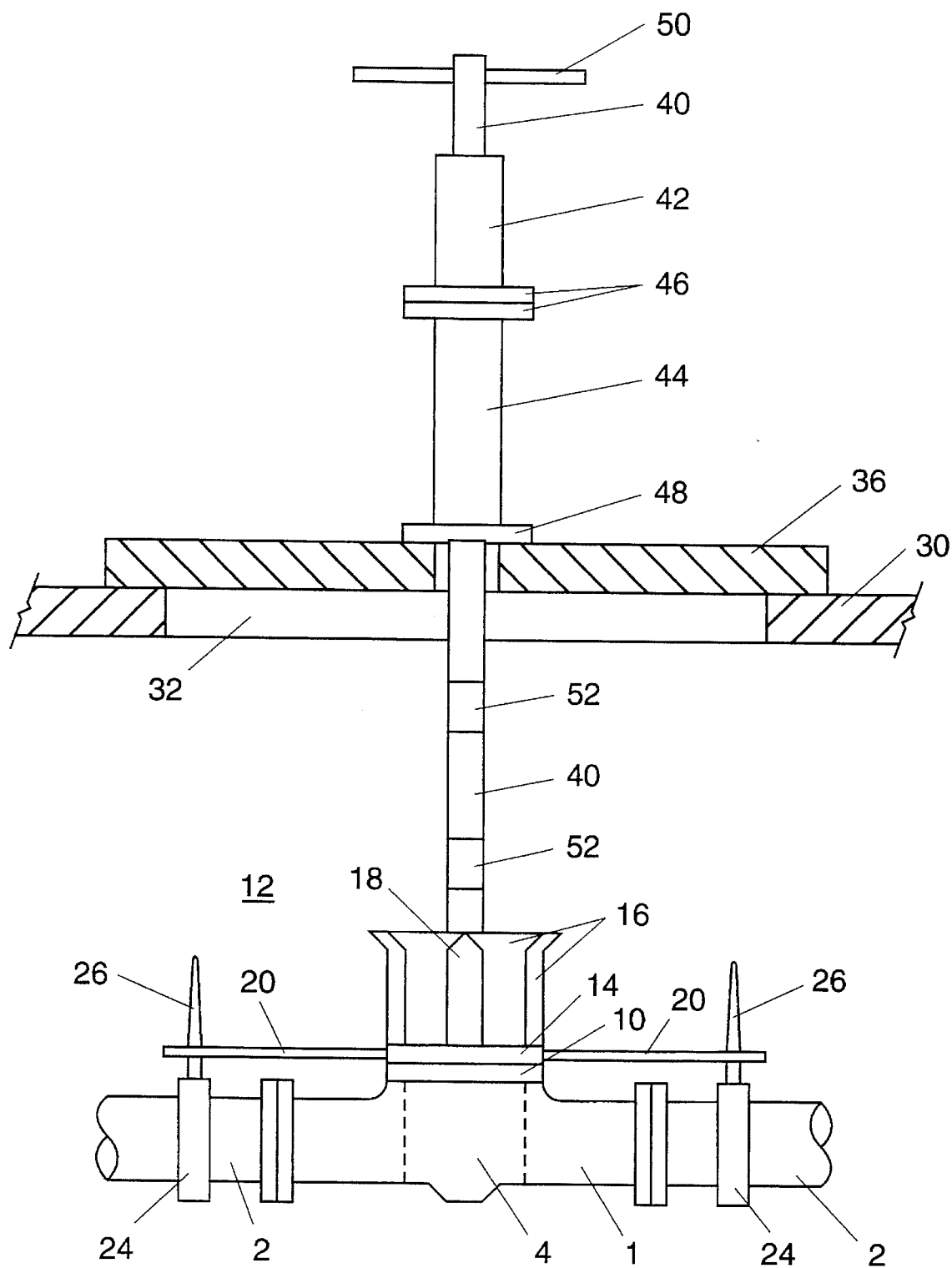
FIG. 1 is an elevational view, partly in cross section, showing an assembly of components in accordance with a preferred embodiment of the invention.

FIG. 1 is an elevational view showing a pipeline containing a conventional ball valve within a valve box, along with an attachment and other components for use in maintaining the ball valve in accordance with the principles of the present invention. The valve which is to be serviced and maintained is installed in a housing 1 connected by attachment point in a pipeline 2.

The valve is constituted by an assembly 4 composed of a valve seat defining a flow path, a flow control member movable relative to the valve seat for blocking or unblocking the valve seat, and thus opening or closing a flow path, and control means including a stem coupled to the flow control member and operable for moving the flow control member relative to the valve seat. Housing 1 has an opening via which assembly 4 can be removed from, and installed in, housing 1, and housing 1 has a plurality of threaded studs which surround the opening and project away from housing 1. A valve housing cover 10 is provided for closing and sealing the opening in housing 1. Cover 10 has a first bore for passage of the stem of the control means when assembly 4 is installed in housing 1 and a plurality of second bores each located for passage of a respective stud when the cover closes the opening in housing 1. A plurality of threaded nuts are engageable with the studs for securing cover 10 to housing 1 when the cover closes the opening in housing 1.

The valve is secured to, and suspended below, cover 10. Since the valve is not a novel feature of the invention, it is not illustrated or described in further detail. The valve can be any conventional ball valve used in a pipeline.

In accordance with one feature of the present invention, the valve is associated with an attachment 12 that rests upon cover 10. When the valve is assembled and in operation, attachment 12 is secured to cover 10 by the nuts provided to attach cover 10 to valve housing 1.

Attachment 12 is composed of a base plate 14 which carries a plurality of nut guide devices 16, one for each nut, and a stem adapter extension guide device 18 which will be described in greater detail below with reference to subsequent drawing figures. In the illustrated embodiment, cover 10 and base plate 14 are structurally separate components.

Base plate 14 carries two strips, or bars, 20. Each strip 20 has a positioning bore 22 (FIG. 3) located at the end of strip 20 which is remote from plate 14; thus, an attachment positioning means comprises in part the strip 20 having a positioning bore 22. Since, as noted above, the attachment 12 rests upon the cover 10, it is apparent that the strip 20, which is part of the attachment 12, is connectable to the cover 10 at least to the extent that the attachment 12 rests on the cover 10.

Two split collars 24 are clamped to pipeline 2 at respectively opposite sides of housing 1 and each collar 24 carries an upwardly projecting guide pin 26. Guide pins 26 are dimensioned, and collars 24 are located, so that engagement of pins 26 in positioning bores 22 will assure accurate positioning of cover 10 on housing 1, and of assembly 4 within housing 1, when attachment 12, cover 10 and assembly 4 are lowered onto the opening of the pipeline housing.

The portion of pipeline 2 containing housing 1 housed within a valve box having a valve box cover 30. Cover 30 is provided with an opening 32 which is large enough to permit passage of attachment 12, cover 10 and assembly 4. Opening 32 is normally closed by a splint cover plate 36 which will be removed only when attachment 12, cover 10 and assembly 4 are to be removed from the interior of the valve box.

FIG. 1 also shows a tool which is provided for opening and closing the valve. The tool is composed of a shaft 40 which is guided in a guide sleeve which, in this embodiment, is composed of two assembled guide sleeve components 42 and 44. Components 42 and 44 are assembled together via flanges 46, and component 44 rests on cover plate 36 via a further flange 48. If needed, components can be provided at flange 48 and/or cover 36 to assure placement of flange 48 at a selected position.

Within component 44 there may be provided appropriate bearings and grease fittings to assure proper support and lubrication of shaft 40.

The upper end of shaft 40 is provided with an operating handle 50 while the lower end of shaft 40 is provided with a valve actuating member which will be described in greater detail below. Shaft 40 is also provided with universal joints 52 to allow for valve movement due to thermal expansion of associated piping.

Figure 2:
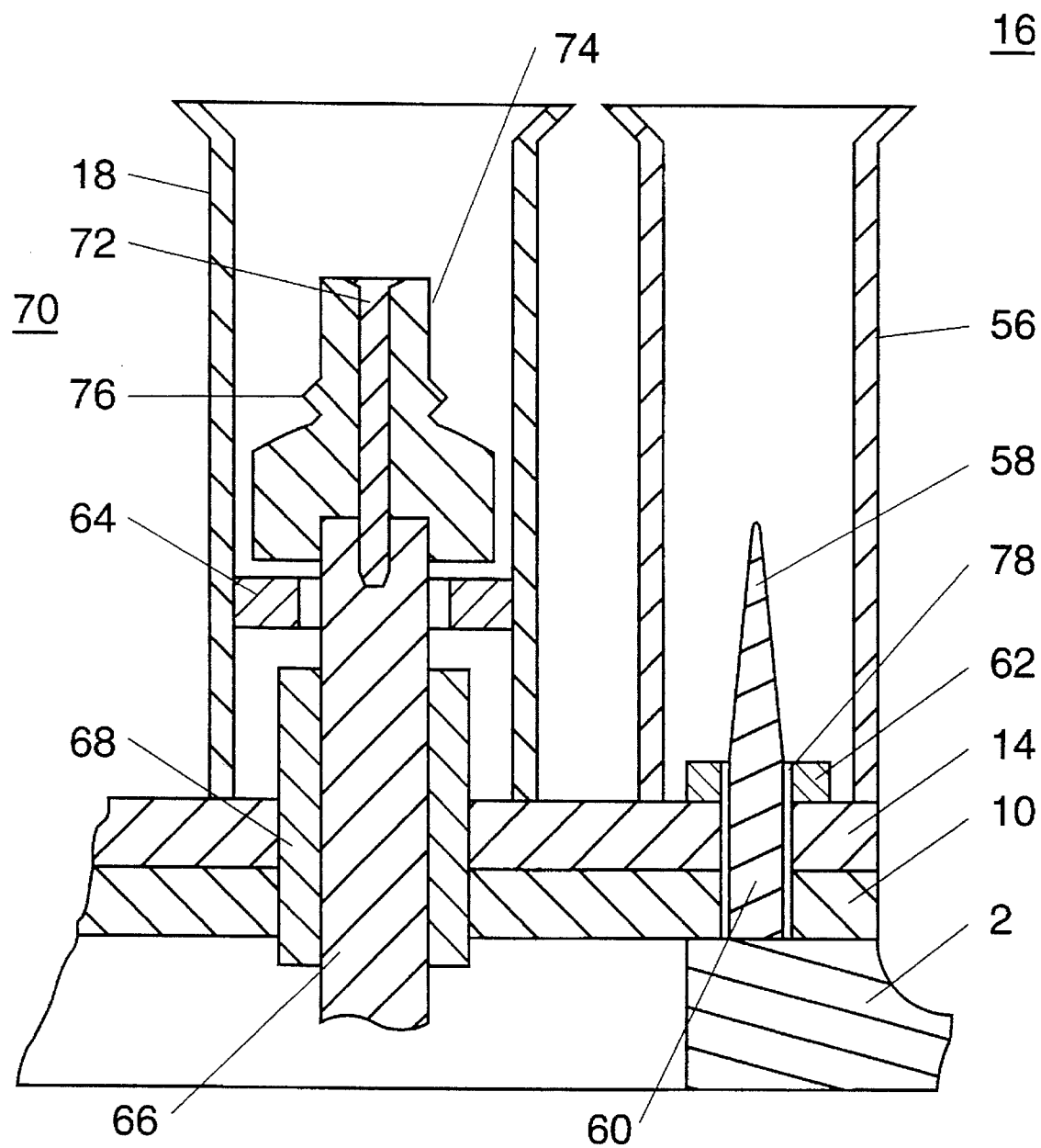
FIG. 2 is a cross-sectional, elevational detail view of a portion of the device shown in FIG. 1.

FIG. 2 is an elevational, cross-sectional detail view of a portion of attachment 12 of FIG. 1, with attachment 12 mounted on cover 10 and housing 1.

Each nut guide device 16 is composed of a guide tube 56 which is secured on plate 14 and a tapered guide pin 58 which is secured at the free end of a respective stud 60. Each stud 60 is secured to housing 1. Studs 60 are distributed around the opening in housing 1. Each guide tube 56 has at its top a flairing or funnel shaped, open upper end.

Servicing of the valve involves removal of assembly 4 via opening 32, in a manner to be described below. Then, to place the valve back into operation, it is necessary to reinstall the refurbished original assembly 4 or install a new assembly 4. According to the invention, assembly 4 is removed from, and returned to, the valve together with cover 10 and attachment 12. Cover 10 is installed on the opening in valve housing 1 by securing respective nuts 62 to studs 60. For removal of cover 10, attachment 12 and assembly 4, all of the nuts 62 must be loosened to a point at which they are completely disengaged from the threading of their associated studs 60. Then, when the parts 4, 10 and 12 are lifted away from housing 1, studs 60 will remain in place at housing 1 formed by pipeline 2 and each nut 62 will remain trapped in an associated guide tube 56.

The inner diameter of guide tube 56 is such that nut 62, when in a horizontal plane, will always be engaged by tapered guide pin 58 and stud 60 during reassembly.

As shown in FIG. 2, stem extension guide device 18 is provided, at its inner surface, with a retaining ring 64, the purpose of which will be described below. Stem extension guide device 18 is in the form of a tube having a flaring, or funnel-shaped, open upper end.

FIG. 2 also shows a portion of a stem 66 forming part of assembly 4 in such a manner that opening and closing of the flow passage controlled by assembly 4 is effected by rotating stem 66 about a vertical axis in FIG. 2. Stem 66 is secured in assembly 4, or the movable part thereof, in a conventional manner which is not illustrated herein. The connection is such that assembly 4 can be removed from housing 1 by lifting stem 66.

Stem 66 is guided within a packing 68 which provides a seal, with respect to the interior of pipeline 2, between stem 66 and cover 10. Stem 66 extends upwardly through ring 64 and the upper end of stem 66 is provided with a stem adapter 70 which performs two essential functions according to the invention: it provides a coupling part which engages with the device at the lower end of shaft 40 to permit stem 66 to be rotated by personnel stationed above cover plate 36; and it provides a connecting part via which the parts 4, 10 and 12 can be lifted out of housing 1 and returned thereto through opening 32. The stem adapter 70 may be permanently secured to stem 66 by any suitable means, such as by a machine screw 72 as illustrated. The lower portion of stem adapter 70 has a diameter which is larger than the opening in ring 64. Thus, when stem adapter 70 is secured to the upper end of stem 66, stem adapter 70 cooperates with ring 64 to assure that attachment 12 will be retained together with cover 10 when those components are removed from housing 1. Ring 64 also cooperates with stem adapter 70 to prevent member 14 from separating from cover 10 enough to cause misalignment if a downward force is exerted on stem adapter 70.

Stem adapter 70 is provided at its upper end with a coupling formation 74 which is constructed to engage with a suitable coupling formation provided at the lower end of shaft 40, as will be described in greater detail below. In addition, adapter 70 is provided with a threaded portion 76 which can be connected to a threaded member of a lifting tool, to be described below, to permit lifting of parts 4, 10 and 12, as well as to permit return of those parts to the installed position illustrated in FIGS. 1 and 2.

Guide pins 26 and positioning bores 22 are dimensioned to assure that when parts 4, 10 and 12 are being lowered during reassembly of the valve, each guide pin 58 will enter aligned bores in cover 10 and base plate 14 and will pass through the center of a nut 62. As nut 62 moves downwardly on tapered pin 58, it will reach a cylindrical region 78 which is dimensioned to closely match the crest diameter of the threads in nut 62, which is the minimum clear internal diameter of nut 62. Therefore, each nut 62 will be accurately aligned with the threaded portion of stud 60. As a result, rotation of nut 62 automatically results in proper engagement with the threaded portion of stud 60 and prevents cross threading, or thread stripping, while nut 62 is being screwed onto stud 60.

Proper positioning of cover 10 and base plate 14 with respect to studs 60 and the interior of the valve is assured by the engagement of guide pins 26 in positioning bores 22 during lowering of attachment 12.

Figure 3:
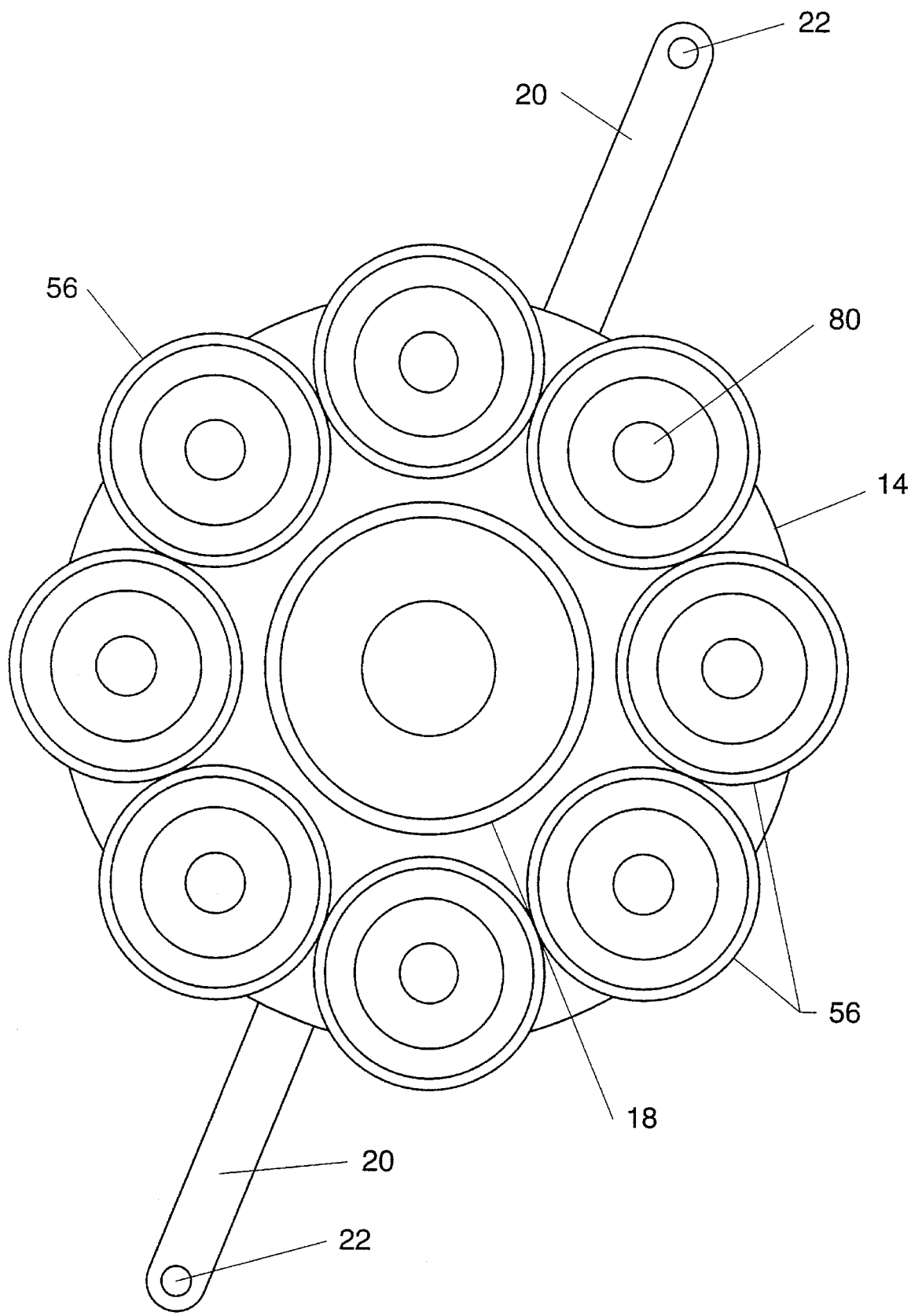
FIG. 3 is a top plan view of a component, according to the invention, of the assembly shown in FIG. 1.

FIG. 3 is a plan view of attachment 12, further illustrating the physical relation between guide device 18 and guide devices 16. At the center of each guide funnel 56, base plate 14 is provided with a respective bore 80 for passage of a respective stud 60. When attachment 12 is in use, a respective nut 62 will be retained in each guide funnel 56.

Figure 4:
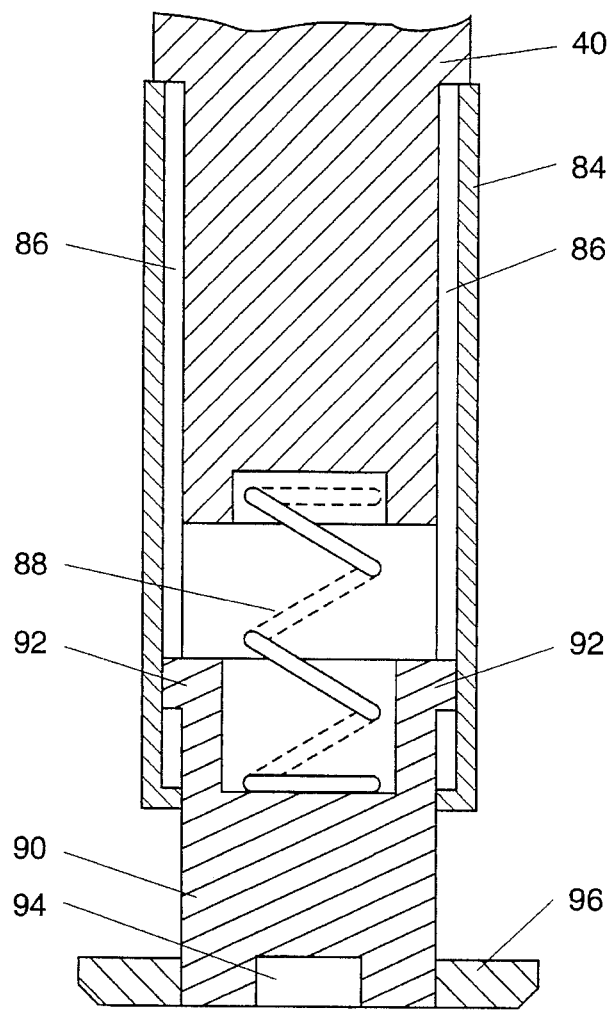
FIG. 4 is a cross-sectional, elevational detail view of a portion of a component, according to the invention, of the assembly of FIG. 1.
Figure 5:
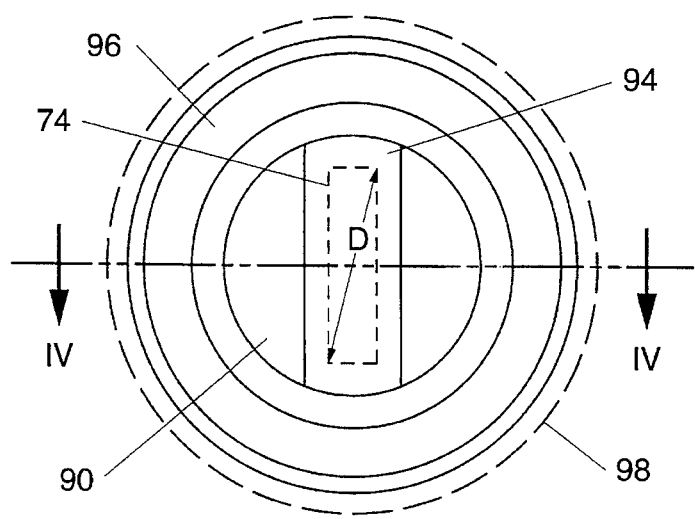
FIG. 5 is a bottom plan view of the component shown in FIG. 4.

FIGS. 4 and 5 are, respectively, an elevational cross-sectional view and a bottom plan view of an embodiment of an actuating part provided at the lower end of shaft 40. FIG. 4 is a cross-sectional view which is taken along line IV—IV of FIG. 5.

The actuating part includes a cylindrical member 84 which is secured around a reduced diameter portion of the lower end of shaft 40. The interior surface of cylindrical member 84 is provided with two opposed longitudinal grooves 86.

The lower end of shaft 40 is provided with a cylindrical recess which receives one end of a compression spring 88. The actuating part further includes a movable tool element 90 which is held within cylindrical member 84 and is dimensioned to be vertically movable within member 84. Tool element 90 has two radial projections 92 which seat in, and slide along, grooves 86. Thus, tool element 90 is free to move axially along cylindrical member 84, while rotation therebetween is prevented.

A cylindrical recess formed in the top face of tool element 90 receives the lower end of compression spring 88.

The lower end of tool element 90 is provided with a slot 94 dimensioned to receive coupling formation 74. Slot 94 and coupling formation 74 are dimensioned, as can be seen from FIG. 5, to assure that stem adapter 70 and stem 66 can be rotated together with shaft 40.

The lower end of tool element 90 carries a collar 96 which centers tool element 90 in device 18 and is dimensioned relative to the inner wall 98 of device 18 (FIG. 2) so as to assure that vibratory movements and forces, such as produced by seismic events, can not be transferred between adapter 70 and tool element 90. Specifically, the clearance between coupling formation 74 and the walls of slot 94 is greater, in each and every direction in the plane of FIG. 5, than the play between collar 96 and inner wall 98. Thus, if seismic events should occur, they will not impose stresses directly on stem 66. Collar 96 has a beveled lower edge, as shown.

In order to couple tool element 90 with stem adapter 70, it is only necessary to lower shaft 40 until tool element rests atop coupling formation 74 and spring 88 is compressed. Then, by rotating shaft 40 through a maximum of 180° in either direction, tool 90 reaches a position in which slot 94 is aligned with coupling formation 74, whereupon tool 90 will snap downwardly so that coupling formation 74 automatically comes to engage in slot 94 and stem adapter 70 can be acted on to rotate stem 66 in order to either open or close the valve.

If tool element 90 is initially pressed against the upper end of stem 70 in an orientation such that coupling formation 74 will not enter slot 94, spring 88, being compressed, will assure that when alignment occurs, tool element 90 snaps down into the engaged position. Thus, a positive and secure coupling between tool element 90 and stem adapter 70 is assured. On the other hand, tool element 90 can be easily disengaged from stem adapter 70 simply by lifting shaft 40 upwardly.

In order to lift parts 4, 10 and 12 out of the valve box, it is necessary to first unscrew nuts 62 from studs 60. Then, parts 4, 10 and 12 can be lifted, with attachment 12 resting on cover 10, by means of a tool which is brought into threaded engagement with threaded portion 76 of stem adapter 70.

Figure 6:
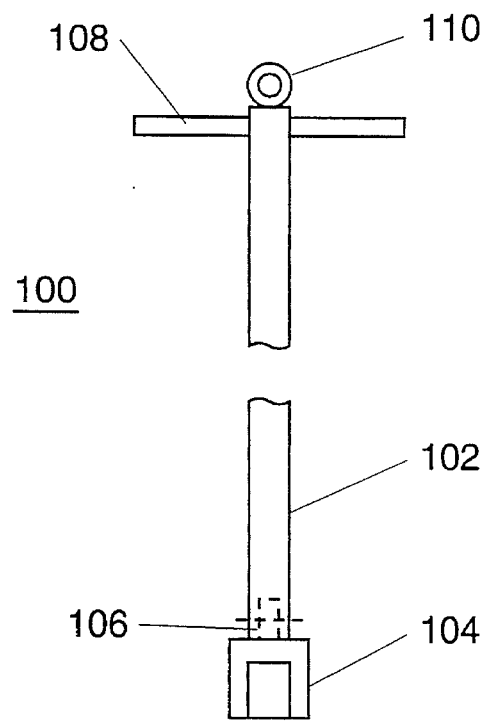
FIG. 6 is an elevational view of a tool which is used with the assembly shown in FIG. 1.

FIG. 6 shows one embodiment of such a tool 100 which is composed essentially of an elongated shaft 102, an internally threaded sleeve 104 secured to the lower end of shaft 102 by any suitable conventional coupling 106, a handle 108 for rotating the tool and a lifting ring 110 for attachment to a lifting device, such as a crane, if this is required to lift parts 4, 10 and 12. The outer diameter of sleeve 104 is dimensioned to be suitably guided in stem extension guide device 18. As shown schematically in FIG. 6, coupling 106 may be composed of a projection on sleeve 104 which fits in a recess in shaft 102 and a coupling pin which extends horizontally through aligned bores in the projection and in shaft 102.

In order to assure that the internal threads in sleeve 104 are perfectly aligned with threaded portion 76 of stem adapter 70 before tool 100 is rotated to establish threaded engagement therebetween, coupling formation 74 of stem adapter 70 is formed to constitute an aligning guide for those internal threads. Specifically, as shown in FIG. 5, coupling formation 74 may have a rectangular outline with a diagonal dimension, D, essentially equal to the free diameter within sleeve 104, i.e. the crest diameter of the internal threads in sleeve 104. Dimension D is, therefore, substantially equal to the root diameter of the threads of threaded portion 76. Coupling formation 74 thus provides four guide edges which assure that sleeve 104 will automatically be properly aligned with threaded portion 76 to assure that when tool 100 is rotated in order to establish a threaded connection between sleeve 104 and threaded portion 76, no cross threading will occur.

Figure 7:
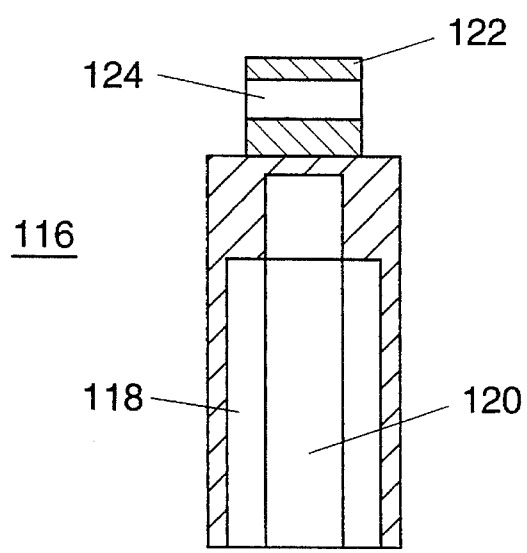
FIG. 7 is a cross-sectional view of a nut removal attachment for the tool of FIG. 6.

Tool 100 may also be employed to remove nuts 62 prior to lifting of parts 4, 10 and 12 and to reattach nuts 62 to studs 60 after parts 4, 10.and 12 have been reinstalled. For this purpose, sleeve 104 may be removed from shaft 102 and replaced with a suitable socket 116, shown in FIG. 7. Socket 116 will be provided with an internal surface 118 formed to mate with the outer surface of each nut 62, and with an elongated central bore 120 dimensioned to accommodate the associated guide pin 58. Finally, socket 116 may be provided with a suitable projection 122 having a bore 24 for engagement in the above-mentioned recess in shaft 102. Also as mentioned above, socket 116 will be held in position by a pin that extends horizontally through bore 124 and through the bores in shaft 102. The projection on sleeve 104 may be identical in form to projection 122.

As will be readily apparent, in order to remove a nut 62, it is only necessary to lower tool 100, with socket 116 attached, into an associated nut guide device 16 and to then rotate tool 100, via handle 108, until the nut is fully disengaged from the threads of the associated stud 60. Tool 100 would then be withdrawn and inserted into the next guide device 16.

In order to tighten nuts 62 after reinstallation of parts 4, 10 and 12, tool 100, with socket 116 attached, can be inserted into each nut guide device 16 in turn. Since each nut 62 will already be in position on the associated cylindrical portion 78 of its associated stud 60, it is only necessary to lower socket 116 into engagement with the associated nut 62, and then rotate tool 100, via handle 108, until the nut is fully tightened. In accordance with a particular feature of the present invention, a torque applying or torque measuring tool can be attached to the upper end of shaft 102 in order to accurately torque each nut 62. Although the application of torque to shaft 102 may produce some torsional deformation of shaft 102, when shaft 102 is stationary or rotated at very low speed, the torque applied at the upper end of shaft 102 will still substantially equal the torque applied by socket 116 to nut 62.

An attachment 12 according to the present invention performs a number of functions and offers a number of significant advantages. For example, base plate 14 of attachment 12 provides a mounting platform for properly positioning devices 16 and 18 relative to one another and relative to associated valve parts. Nut guide devices 16, equal in number to the number of studs 60 that retain valve cover 10, each have an inside diameter such that its associated nut 62 is properly positioned to receive an associated guide pin 58 as attachment 12 is lowered onto housing 1.

Base plate 14 itself provides a structural tie-in surface for guide devices 16 and 18. Guide devices 16 and 18 may be secured to base plate 14 by welding at spaced points. The upper ends of devices 16 and 18 may also be tack welded together to provide a strong, cohesive assembly such that any seismic generated loads transferred from shaft 40 into guide device 18 can be transferred into the valve body and not the valve stem.

The funnel portions at the tops of guide tubes 16 and 18 provide targets for tool element 90, and sleeve 104 and socket 116 to facilitate the performance of all operations by personnel standing above valve box cover 30. While the inclination of these funnel portions can vary, in general, the flatter the angle in the horizontal plane the easier it is to observe those reflective surfaces, and thus the easier it is to properly guide a tool element or socket. Generally, it is preferable for this angle to be between 30° and 45°.

Stem extension guide device 18 is intentionally given the largest diameter possible to provide the best possible target for installing tool element 90. The engagement of collar 96 in guide device 18 only requires that tool element 90 be initially located approximately over guide device 18 prior to being lowered into device 18.

Referring to strips 20 and positioning bores 22, it is preferable that the radial clearances between guide pins 26 and bores 22 not be unduly large to assure that assembly 4 can be correctly aligned and properly guided into the housing 1 defined by pipeline 2 without encountering any interfering devices or being struck so as to come out of alignment.

Preferably, compression spring 88 is given a spring rate sufficient to assure that tool element 90 will snap down into position on stem adapter 70 but to limit axial loading imposed on stem 66 by tool element 90 and shaft 40.

Cover 10 and base plate 14 are provided with formations which maintain them properly positioned relative to one another.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An attachment for facilitating remote servicing of a valve, the valve including:
    an assembly composed of a valve seat defining a flow path, a flow control member moveable relative to the valve seat for blocking and unblocking the valve seat and control means including a stem coupled to the flow control member and operable for moving the flow control member relative to the valve seat;
    a housing for receiving the assembly, the housing having an opening via which the assembly can be removed from, and installed in, the housing, and the housing having a plurality of first threaded fastening components which surround the opening;
    a valve housing cover for closing and sealing the opening in the housing, the cover having a first bore for passage of the stem of the control means when the assembly is installed in the housing and a plurality of second bores each located to be aligned with a respective first threaded fastening component when the cover closes the opening in the housing; and
    a plurality of second threaded fastening components engagable with the first threaded fastening components for securing the cover to the housing when the cover closes the opening in the housing, wherein said attachment comprises:
        a plurality of fastening component guide devices connectable to the valve housing cover and removable from the housing, each guide device operatively associated with a respective first fastening component having a threaded portion for retaining a respective second threaded fastening component thereon, said first fastening component having a non-threaded tapered guide portion thereon for guiding the respective second threaded fastening component into alignment with the respective first fastening component to enable the second threaded fastening component to be rotated into engagement with the first threaded fastening component portion; and attachment position means cooperatively associated with said cover and said housing for aligning said fastening component guide devices with the first fastening compound.

2. An attachment as defined in claim 1, wherein the first threaded fastening components are studs which project away from the housing, the second threaded fastening components are nuts, and said fastening component guide devices are nut guide devices.

3. An attachment as defined in claim 2 wherein: each of said nut guide devices comprises a cylindrical nut receiving member surrounding a respective stud and dimensioned to surround and retain a respective nut in at least approximate alignment with the respective stud; and said attachment further comprises a plurality of elongate nut positioning members each projecting from a respective stud and insertable through a respective nut for aligning the respective nut with the respective stud when the respective nut is disengaged from the respective stud.

4. An attachment as defined in claim 3 wherein said attachment positioning means comprise a first positioning member fixed relative to said cover and said nut guide devices and a second positioning member fixed relative to the housing and engageable with said first positioning member for guiding said nut guide devices into a defined assembly position relative to the housing.

5. An attachment as defined in claim 4 further comprising a base plate which carries said nut guide devices and said first positioning member and which has a plurality of bores aligned with the first and second bores in the cover, said base plate being interposed between the cover and said nut guide devices.

6. An attachment as defined in claim 4 further comprising a cylindrical stem receiving member fixed relative to said nut guide devices and dimensioned to surround the stem of the control means for guiding a valve actuating tool into operative association with the stem.

7. An attachment as defined in claim 2 further comprising a cylindrical stem receiving member fixed relative to said nut guide devices and dimensioned to surround the stem of the control means.

8. An attachment as defined in claim 7 in combination with:

a stem adapter fixed to the stem of the flow control member, the stem being rotatable about an axis for moving the flow control member relative to the valve seat and the stem adapter having a first engagement end with a noncircular cross section in a plane perpendicular to the axis; and an actuating tool comprising a second engagement end formed to engage said first engagement end in a manner to permit said stem adapter to be rotated about the axis by rotation of said actuating tool, wherein said first and second engagement ends are dimensioned to engage one another with a first play in the plane perpendicular to the axis and said second engagement end engages in said stem receiving member with a second play in the plane perpendicular to the axis, the first play being greater than the second play in every direction in the plane perpendicular to the axis.

9. The combination as defined in claim 8 wherein said actuating tool further comprises an elongated handle and a spring coupled between said handle and said second engagement end for permitting relative movement between said handle and said second engagement end along the axis in response to application of an axial force to said second engagement end.

10. An attachment as defined in claim 1 in combination with:

a stem adapter fixed to the stem of the flow control member, the stem adapter having a connecting portion; and a removal tool having an end which is connectable to said connecting portion for enabling removal of the assembly from the housing by movement of said removal tool when the first threaded fastening components are disengaged from the second threaded fastening components.

11. The combination defined in claim 10 wherein:

said connecting portion of said stem adapter and said removal tool end have mating threads and said connecting portion has a surface portion adjacent the associated thread for aligning said coupling portion with said removal tool end preparatory to coupling of said mating threads with one another.

* * * * *